Patented Dec. 6, 1949

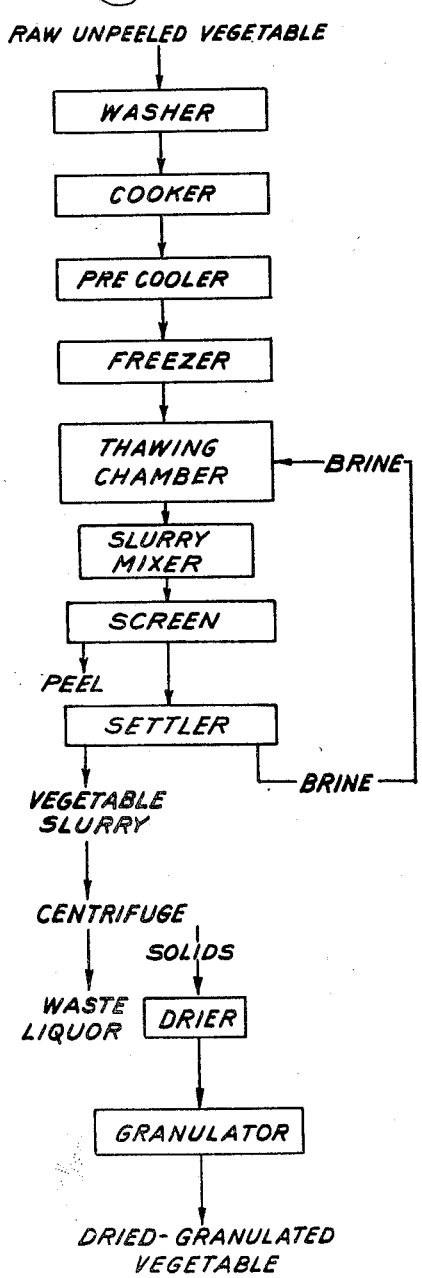
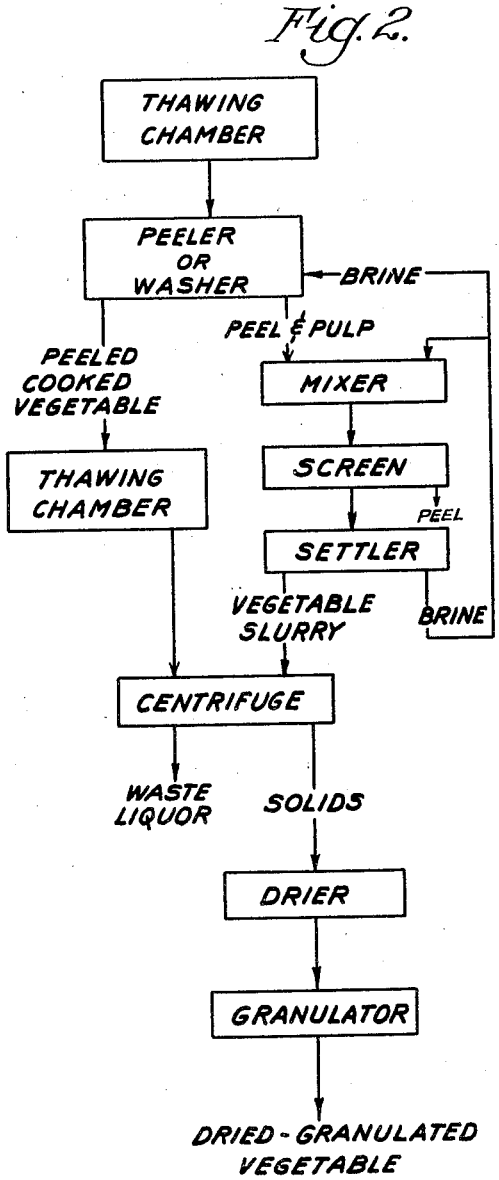

2,490,431

UNITED STATES PATENT OFFICE 2,490,431

DEHYDRATING PROCESS FOR STARCHY VEGETABLES, FRUITS, AND THE LIKE

John W. Greene, Ralph M. Conrad, and Frederick A. Rohrman, Riley County, Kans., assignors, by mesne assignments, to Research Corporation, New York, N. Y., a corporation of New York Application July 19, 1946, Serial No. 684,638

7 Claims. (Cl. 99—207)

This invention relates to the dehydration of starchy vegetables such as potatoes, artichokes, sweet potatoes, turnips and other starchy vegetation products particularly those having a peel. In common dehydration processes, two difficulties are normally encountered. First, unless a vegetable such as potatoes, is cooked and dried properly, rupture of the vegetable cells takes place to such an extent that the dried product, when moistened for use, forms a mass which is inferior to the ordinary mashed potato because of possessing a pasty texture and a less pleasing flavor. Rupture of 25 per cent or more of potato cells produces this undesirable result. Second, peeling and trimming results in unduly high losses frequently being as high as 15 to 40 per cent of the vegetable.

In accordance with the present invention an improved process has been provided whereby starchy vegetation products may be separated from their peel in a simple manner and also a process has been provided whereby such products (herein referred to as vegetables) may be cooked and dehydrated without excessive rupture of the edible cells and loss thereof with the peel. This process is accomplished by cooking a vegetable such as potatoes in an unpeeled state or at least with substantial edible matter attached to the peel, cooling and slow freezing the cooked vegetable to toughen its cells, forming a slurry or similar mixture of the cooked vegetable with an aqueous solution containing sufficient dissolved table salt or other dissolved edible matter to prevent excessive rupture of the vegetable cells, and screening the peel from the mixture.

Complete inhibition of cell rupture is unnecessary. It has been found that if rupture of cells is held below about 10 per cent of the total cells, production of a pasty product is avoided. The screened product with the toughened unbroken cells is then dried. In this improved process only an insignificant portion of the cells are ruptured, usually less than 10–15 per cent. Dried potatoes when so prepared and later moistened, closely resemble ordinary freshly cooked and mashed potatoes in consistency, appearance and taste. Furthermore the loss of vegetable matter is reduced from 15–40 per cent to as low as 5 to 8 percent, computed upon the basis of the dry solids originally in the vegetable.

Suitable methods by which the present invention may be utilized for dehydration of vegetables are diagrammatically illustrated in the accompanying drawings in which Fig. 1 and Fig. 2 are alternative flow diagrams of processes of dehydrating a vegetable such as a potato by methods herein contemplated.

Considering the process illustrated in Fig. 1, potatoes may be washed and cooked without first peeling. The potatoes may be whole or sliced though cooking of ¾" slices is usual for 30 minutes in steam at 212° F. To toughen the cells the cooked product may be cooled in a precooler and slowly frozen and the temperature slowly lowered somewhat below 32° F., for example 10 to 25° F., the rate of freezing and subsequent lowering of the temperature being sufficiently slow to prevent substantial rupture of the cells. Thereafter the frozen product is thawed, mixed or suspended in an aqueous medium and the mixture is screened to remove the peel from the slurry.

If plain water is used to slurry the potatoes, undue rupture of the starchy cells in the potato tends to occur. This appears to be due to a tendency for the water to migrate through the cell walls, swelling and ultimately bursting the cells. Such tendency for the aqueous medium to migrate inwardly through the cell walls by osmosis is inhibited by adding dissolved solids thereto. For example a sodium chloride solution containing 0.5 to 5 per cent (preferably about 2 per cent by weight of NaCl) substantially completely inhibits rupture of the vegetable cells. Other dissolved solids which are edible or at least non-toxic may be used to equalize the osmotic pressure upon opposite sides of the cells or at least to prevent migration of water into the cells to an extent that cell rupture occurs to an objectionable degree (25 per cent or more). Other examples of suitable osmosis inhibitions are sugar, sodium nitrate, potassium nitrate, potassium chloride or an aqueous extract of the vegetable being treated may be used for this purpose. However, most of such solids flavor the potato to an undesirable degree or produce an inedible or unpalatable product. Use of sodium chloride solutions has the advantage that the salt properly flavors the product.

Following formation of the slurry, it is passed over a screen having a porosity of about 8 to 20 mesh to separate the peel from the edible portion. This peel contains but insignificant quantities of edible matter attached thereto and may be discarded. The slurry which passes through the screen may be concentrated by settling or similar means to remove the brine which may be recovered. The settled solids may be centrifugally or otherwise dewatered to form a filter cake which may be partially dried in an oven or a rotary drier. Partial removal of water by centrifugation or similar mechanical means is advantageous since it reduces the amount of water which must be evaporated in the drier and also results in removal of certain dissolved or suspended agents which darken the potatoes or produce off-flavors. The water removed by centrifugation includes a portion, rarely more than one fourth to one half, of the water initially in the potato. The moisture content of the pulp leaving the centrifuge may be about 60% and the drier may reduce this to 35% to 45%. This further diminuation of moisture content facilitates the ensuing granulation step. Following the drying step or the centrifuging step the pulp is granulated by passing though a screen into a current of air at 225° F. to 250° F. (preferably 240° F.) and collected in granulated form by a cyclone separator.

According to a further embodiment of the invention the potatoes may be peeled prior to or after cooking and the pulp-bearing peel subjected to the treatment herein contemplated. Such a process permits a rough separation of the peel from the edible pulp or heart of the potato and involves use of the separation process with less material associated with the peel. If desired, the potatoes can be peeled and the hearts and peel cooked separately. Thereafter the peel may be slurried as herein described and the edible matter separated therefrom by screening or similar means and dried, while the cooked heart of the potato is mixed with the slurry only after discard of the peels.

Removal of the peel prior to cooking is slow and of course involves plain drudgery. In accordance with the present invention, this peel removal may be effected simply by a process such as illustrated in the flow diagram of Fig. 2. Thus potatoes may be washed and cooked in a manner such as to preserve their form and to prevent integration. This may be accomplished in an atmosphere of steam or by other means. The cooked product is then slowly frozen for example to 10–25° F. Thereupon the vegetable may be surface thawed by raising the surface temperature of the cooked vegetable above freezing whereby the surface thaws leaving the interior frozen and the peel is removed. It has been found that the peel from such partially thawed potato or similar vegetable may be simply removed by washing the thawed suface layer together with the peel from the frozen interior of the vegetable thereby eliminating excessive hand labor.

The peel so removed may be slurried with brine or similar solution to prevent rupture of the cells as previously described. For example the peel may be removed from the frozen vegetable by washing the vegetable with brine for a short time and removing the resultant slurry of peel and some edible portion of the potato from the frozen interior portion. The slurry thus obtained may be screened to separate the peel from the edible component and the slurry settled to remove the brine. Thereafter the solids are centrifuged and dried. The peeled potatoes may be thawed and centrifuged separately or combined with the solids recovered from the peel and centrifuged and dried in the usual manner.

The following examples are illustrative:

1. A quantity of potatoes were washed, sliced and cooked for 30 minutes in an atmosphere of steam at atmospheric pressure. The cooked potatoes were slowly frozen over a period of one hour to a temperature of 18° F. The potatoes were then thawed and slurried in aqueous brine containing 2 per cent by weight of NaCl using approximately two parts by weight of brine per part by weight of potato. Other slurry concentrations may be used so long as a readily filterable slurry is obtained. The slurry was washed through a 16 mesh screen which separated the peel and the eyes from the potato. The screened pulp was concentrated by settling and dewatered in a centrifuge. The potatoes containing about 60% by weight of water were granulated through an 18 mesh screen and dried while suspended in an air stream at a temperature of 240° F. It was found that granulation is expedited by further drying the potatoes to about 40% water content after centrifuging and prior to passing through the 18 mesh screen into the desiccating air stream. The peel loss amounted to about 5.8 per cent of the solids based upon the dry weight of solids in the potatoes. The product when moistened formed palatable mashed potatoes of excellent color.

2. A quantity of potatoes were washed, sliced, cooked and frozen as in Example 1. The potatoes were surface thawed by contacting them with a 2% brine at 60° F. for 10 minutes. The skin and eyes were washed off with the brine. The skin and eyes thus washed off were slurried in brine as in Example 1 and screened to separate the skin from the potato pulp. The screened potato pulp after separation from the screened skin was concentrated by settling, dewatered by centrifuging and dried while suspended in air at 240° F.

The bulk of the potatoes which had been separated from the peel or skin were thawed, centrifuged to reduce the water content to 60% by weight and the dewatered material was granulated and dried in a parallel flow drier while contacting the granulated product with air stream at 240° F. An overall recovery of 92.2% by weight of the solids originally in the potatoes was secured. The product when moistened formed palatable mashed potatoes having excellent color.

While the process has been described with particular reference to potatoes it is not limited thereto since other vegetables or fruits may be treated as herein contemplated. Thus various vegetables or fruits which have a peel or skin may be treated to separate the peel from the edible matter thereof by freezing the vegetable or fruit surface thawing the frozen product and washing with water or otherwise treating to remove the thawed peel from the frozen body of the fruit or vegetable. Where necessary the vegetable or fruit may be cooked by steaming without destroying the general shape of the vegetable or fruit in order to facilitate removal of the skin. Peaches and pears, as well as the vegetables listed above may be treated in this manner.

Furthermore the process herein contemplated of separating peel from edible pulp by forming and screening a slurry of the pulp and peel in an aqueous medium containing sufficient dissolved solids to inhibit rupture of more than 10–15 per cent of the cells, may be applied to various vegetables which have a peel or outer skin and which contain starch or sugars in cells which are essentially undestroyed after cooking. For example other tubers such as artichokes or other fruits or vegetables which, when cooked, have a cellular structure of edible carbohydrate may be so treated and rupture of the cells minimized by adjustment of the content of dissolved solids to overcome at least partially the tendency of the aqueous phase of the slurry to migrate into and thereby rupture vegetable or fruit cells.

Although the present invention has been described with reference to the details of certain specific embodiments thereof it is not intended that such details shall be regarded as limitations upon the scope of the invention.

What is claimed:

1. A method of dehydrating potatoes which comprises cooking the potato, freezing and thawing the cooked potato whereby to toughen the cells thereof, forming a slurry of at least a portion of the edible part of the potato which is unpeeled in an aqueous solution containing .5% to 5% by weight of sodium chloride to inhibit excessive rupture of the potato cells, screening the peel from the potato, mechanically separating a portion of the solution from the potato and drying the potato.

2. In a method of dehydrating a potato crop having a peel wherein the crop is cooked, frozen, thawed, separated from the peel and dried, the improvement which consists in partially thawing the frozen crop to produce a crop having a frozen interior with the peel and portion contiguous to the peel in its thawed state, and washing the partially thawed crop to remove the peel therefrom.

3. In a method of dehydrating a potato crop having a peel wherein the crop is cooked, frozen, thawed, separated from the peel and dried, the improvement which consists in partially thawing the frozen crop to produce a crop having a frozen interior with the peel and portion contiguous to the peel in its thawed state, and washing the partially thawed crop with an aqueous solution containing at least .5% dissolved sodium chloride to remove the peel therefrom.

4. A method of dehydrating peel-covered potato having a cellular structure wherein the cells enclose a carbohydrate substance, comprising cooking the potato, slow freezing such potato and thawing the same to toughen the cells thereof, forming a slurry of at least a portion of said potato that is unpeeled in an aqueous solution containing a dissolved sodium chloride in a quantity of at least .5% for at least diminishing migration of water into the cells, separating the peel from the slurry, separating the cellular product from the solution, centrifuging the product to lower its water content, drying and granulating the product.

5. A method of dehydrating peel-covered potato having a cellular structure wherein the cells enclose a carbohydrate substance, comprising cooking said potato, slow-freezing and thereafter thawing the potato to toughen its cells, forming a slurry of an unpeeled portion of the potato in an aqueous solution containing substantially .5% to 5% sodium chloride by weight for at least diminishing migration of water into the cells, separating the peel from the slurry, separating the cellular product from the solution, centrifuging the product to lower its water content, drying and granulating the product.

6. A method of dehydrating peel-covered potato having a cellular structure wherein the cells enclose a carbohydrate substance, comprising cooking said potato, slow-freezing and thereafter thawing the peel and the portion of the potato contiguous thereto leaving the interior portion in its frozen state, removing the peel and contiguous portion from said partially thawed potato by washing said potato with an aqueous edible salt solution containing from .5% to 5% sodium chloride by weight, separating the peeled potato from the wash solution containing the peel and contiguous potato, separating the peel from said contiguous potato and solution by screening, mechanically separating a portion of the solution from the potato, and drying the potato.

7. A method of dehydrating peel-covered potatoes which comprises cooking the potato, freezing and thawing the cooked potato whereby to toughen the cells thereof, forming a slurry of at least a portion of the edible part of the potato which is unpeeled in an aqueous solution containing approximately 2 per cent by weight of sodium chloride to inhibit excessive rupture of the potato cells, screening the peel from the potato, mechanically separating a portion of the solution from the potato and drying the potato.

JOHN W. GREENE.
RALPH M. CONRAD.
FREDERICK A. ROHRMAN.

REFERENCES CITED

The following references are of record in the file of this patent:

UNITED STATES PATENTS

| Number | Name | Date |
|---|---|---|
| 1,151,674 | Durant | Aug. 31, 1915 |
| 1,259,635 | King | Mar. 19, 1918 |
| 1,571,945 | Heimerdinger | Feb. 9, 1926 |
| 2,176,347 | Jansen | Oct. 17, 1939 |
| 2,278,472 | Musher | Apr. 7, 1942 |
| 2,381,838 | Rendle | Aug. 7, 1945 |